US012792893B2

(12) United States Patent
Theilman et al.

(10) Patent No.: US 12,792,893 B2
(45) Date of Patent: Nov. 10, 2026

(54) NEURAL CIRCUITS FOR LEARNING SOLUTIONS FOR DISCRETE OPTIMIZATION

(71) Applicant: National Technology & Engineering Solutions of Sandia, LLC, Albuquerque, NM (US)

(72) Inventors: Bradley Harold Theilman, Albuquerque, NM (US); James Bradley Aimone, Keller, TX (US)

(73) Assignee: National Technology & Engineering Solutions of Sandia, LLC., Albuquerque, NM (US)

( * ) Notice: Subject to any disclaimer, the term of this patent is extended or adjusted under 35 U.S.C. 154(b) by 617 days.

(21) Appl. No.: 18/218,694

(22) Filed: Jul. 6, 2023

(65) Prior Publication Data

US 2025/0013860 A1 Jan. 9, 2025

(51) Int. Cl.
*G06N 3/063* (2023.01)

(52) U.S. Cl.
CPC .................................... *G06N 3/063* (2013.01)

(58) Field of Classification Search
CPC ...................................................... G06N 3/063
USPC ............................................................ 706/26
See application file for complete search history.

(56) References Cited

U.S. PATENT DOCUMENTS 6,631,390 B1 * 10/2003 Epstein ................. H04L 9/0866 708/250
7,284,024 B1 * 10/2007 Trifonov ................ B82Y 10/00 708/3
9,275,328 B1 * 3/2016 Minkovich ............ G06N 3/088
10,679,118 B2 * 6/2020 Lin ......................... G06F 17/16
11,289,175 B1 * 3/2022 Srinivasa .............. G06F 18/214
(Continued)

FOREIGN PATENT DOCUMENTS

EP 3340124 A1 * 6/2018 ............. G06N 3/049
EP 4167136 A1 * 4/2023 ............. G06N 3/065
(Continued)

OTHER PUBLICATIONS

Theilman, B and Aimone B. "Goemans-Williamson MAXCUT approximation algorithm on Loihi," Nice 2023, Apr. 11-14, 2023, San Antonio, TX, USA.
(Continued)

*Primary Examiner* — Abdallah A El-Hage Hassan
(74) *Attorney, Agent, or Firm* — Gregory M. Doudnikoff; Yee & Associates, PC; Merle W. Richman

(57) ABSTRACT

Solving a discrete optimization problem in a neuromorphic device is provided. A number of random noise generators are connected to a number of leaky integrate and fire (LIF) neurons. Weights are assigned to the connections between the random noise generators and the LIF neurons. The weights are chosen to produce a correlation matrix determined by the discrete optimization problem. The LIF neurons integrate random bits generated by the random noise generators according to the assigned weights to produce specified correlated activity variables. The correlated activity variables are fed to an output LIF neuron that operates according to a plasticity rule and outputs an approximate solution to the discrete optimization problem according to the correlated activity variables.

16 Claims, 10 Drawing Sheets

(56) References Cited

U.S. PATENT DOCUMENTS

| | | | | |
|---|---|---|---|---|
| 11,755,891 | B2 * | 9/2023 | Vineyard | G06F 18/2411<br>706/20 |
| 2018/0174028 | A1 * | 6/2018 | Lin | G06N 3/049 |
| 2018/0174041 | A1 * | 6/2018 | Imam | G06N 3/063 |
| 2024/0028879 | A1 * | 1/2024 | Buckley | G06N 3/048 |
| 2025/0013860 | A1 * | 1/2025 | Theilman | G06N 3/049 |

FOREIGN PATENT DOCUMENTS

| | | | | |
|---|---|---|---|---|
| KR | 20230054136 | A * | 4/2023 | G06N 3/065 |
| KR | 20230092286 | A * | 6/2023 | G06N 3/063 |
| WO | WO-2023196917 | A1 * | 10/2023 | G06V 10/764 |

OTHER PUBLICATIONS

Theilman, B. et al., "Stochastic Neuromorphic Circuits for Solving Maxcut," arXiv:2210.02588v1, Oct. 2022.

* cited by examiner

NEURAL CIRCUITS FOR LEARNING SOLUTIONS FOR DISCRETE OPTIMIZATION

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The present disclosure relates generally to probabilistic computing and more specifically to discrete optimization within neuromorphic circuits.

2. Background

Despite the heavy requirements for noise-free operation placed on the components of conventional computers, random numbers play a crucially important role in many parallel computing problems arising in different scientific domains. Because current random number generation occurs largely in software, the required randomness in these systems is plagued by the same memory-processing bottlenecks that limit ordinary computation. Current work in material science and microelectronics is demonstrating the feasibility of constructing stochastic microelectronic devices with controllable statistics for probabilistic neural computing. These devices show scalability properties that forecast the ability to generate random numbers in-situ with the processing elements, bypassing this bottleneck.

Stochasticity is an inherent property of physical systems, both natural and artificial. Physical computers are able to approximate ideal computations because much effort has been expended in developing electronic technology that minimizes the influence of universal electronic “noise.” As microelectronics get smaller and the scale of computations get larger, current computational paradigms require even more stringent limits on the influence of this electronic noise, and these limits become severe constraints on the scalability of existing computational architectures.

In contrast, natural brains are examples of highly parallel computational systems that achieve amazingly efficient computational performance in the face of ubiquitous noise. There are on the order of $10^{15}$ synapses in a human brain, and each one is stochastic: its probability of successfully transmitting a signal to a downstream neuron ranges from 0.1 to 0.9. Each synapse is activated about once per second on average. Therefore, the brain generates about $10^{15}$ random numbers per second. Compare this to the reliability of transistor switching in conventional computers, where the probability of failure is less than $10^{-14}$. It is unknown precisely how brains deal with this stochasticity, but its pervasiveness strongly suggests that the brain uses its own randomness as a computational resource rather than treating it as a defect that must be eliminated. This suggests that a new class of parallel computing architectures could emerge from combining the computational principles of natural brains with physical sources of intrinsic randomness. This would allow the natural stochasticity of electronic devices to play a part in large-scale parallel computations, relieving the burden imposed by requiring absolute reliability.

Realizing the potential of probabilistic neural computation requires rethinking conventional parallel algorithms to incorporate stochastic elements from the bottom up. Additionally, techniques for controlling the randomness must be developed so that useful random numbers can be produced efficiently from the desired distributions. In this work, we propose neuromorphic circuits that demonstrate the capacity for intrinsic randomness to solve parallel computing problems and techniques for controlling device randomness to produce useful random numbers.

Therefore, it would be desirable to have a method and apparatus that take into account at least some of the issues discussed above, as well as other possible issues.

SUMMARY

An illustrative embodiment provides a method for solving a discrete optimization problem in a neuromorphic device. The method comprises connecting a number of random noise generators to a number of leaky integrate and fire (LIF) neurons. Weights are assigned to the connections between the random noise generators and the LIF neurons. The weights are chosen to produce a correlation matrix determined by the discrete optimization problem. The LIF neurons integrate random bits generated by the random noise generators according to the assigned weights to produce specified correlated activity variables. The correlated activity variables are fed to an output LIF neuron that operates according to a plasticity rule and outputs an approximate solution to the discrete optimization problem according to the correlated activity variables.

Another illustrative embodiment provides a neuromorphic device for solving a discrete optimization problem. The neuromorphic device comprises connecting a number of random noise generators and a number of leaky integrate and fire (LIF) neurons connected to the random noise generators. The LIF neurons integrate random bits generated by the random noise generators according to the assigned weights to produce specified correlated activity variables. Weights are assigned to the connections between the random noise generators and the LIF neurons. The weights are chosen to produce a correlation matrix determined by the discrete optimization problem. An output LIF neuron operating according to a plasticity rule receives the correlated activity variables and outputs an approximate solution to the discrete optimization problem according to the correlated activity variables.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
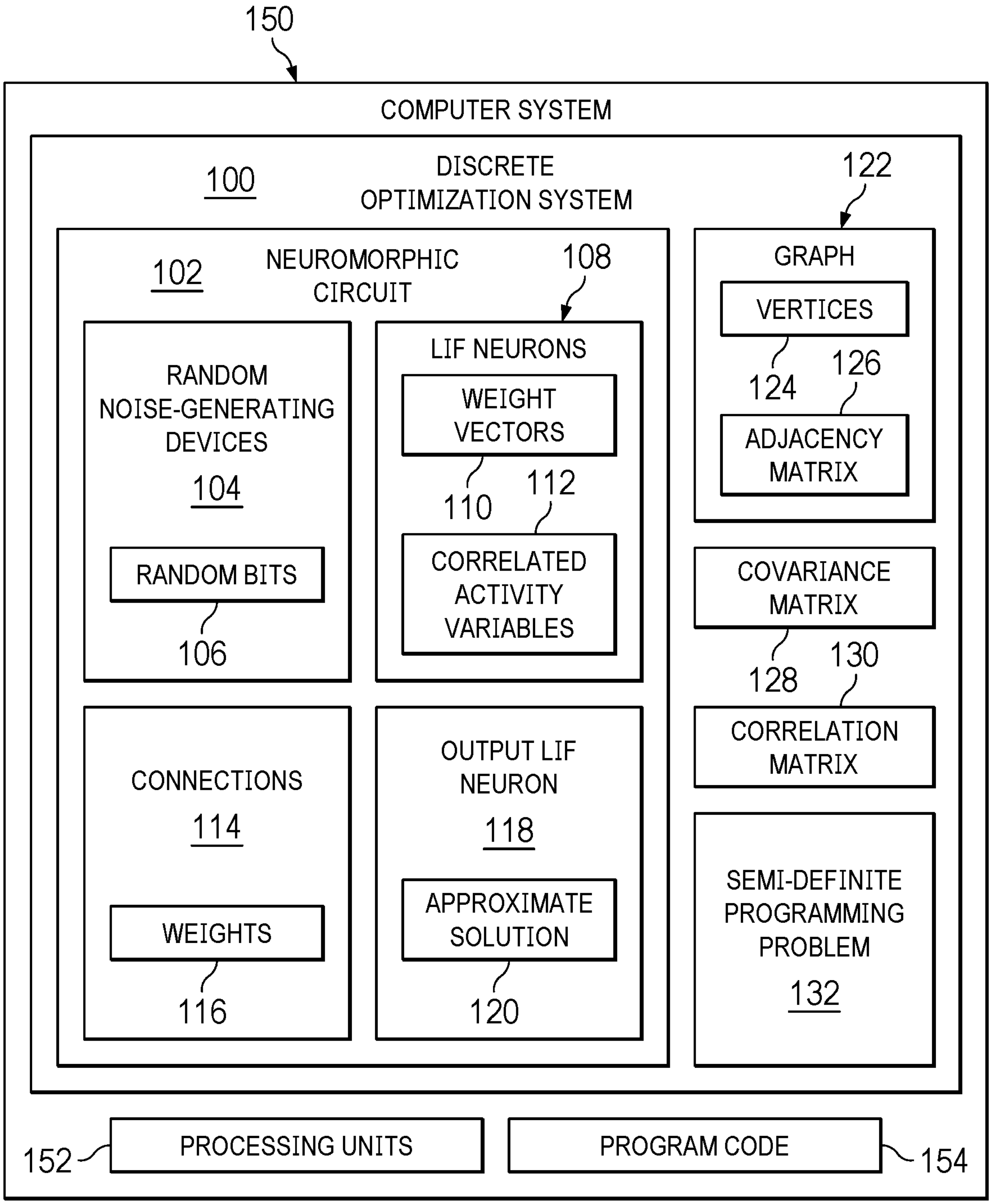
FIG. 1 depicts a block diagram of a discrete optimization system in accordance with an illustrative embodiment.

The illustrative embodiments recognize and take into account that neuromorphic computing is showing promising advantages for graph algorithms and discrete optimization. Typically, neuromorphic graph algorithms exploit the graph structure of a spiking neural network along with the intrinsic discreteness of individual spikes. On the other hand, neuromorphic approaches to discrete optimization often rely on Ising-type neural circuits, which may be difficult to design to meet the requirements of the algorithm and the constraints of neuromorphic hardware. Inspired by the intrinsic stochasticity of natural brains, recent research efforts seek to co-design new neuromorphic devices, circuits, and algorithms to use intrinsic randomness for probabilistic computing paradigms.

The illustrative embodiments also recognize and take into account that several hard problems in discrete optimization admit practically important probabilistic approximation algorithms. One important example is the graph MAXCUT problem, which requires dividing the vertices of a graph into two classes such that the number of edges bridging between the classes is maximized. MAXCUT is a well-known, NP (nondeterministic polynomial)-complete problem that has practical applications and serves as a model problem and testbed for both classical and beyond-Moore algorithm development. MAXCUT has several stochastic approximation algorithms, which makes it an ideal target for developing new architectures leveraging large-scale parallel stochastic circuit elements for computational benefit.

Stochastic approximation algorithms are compared via their approximation ratio, which is the ratio of the expected value of a stochastically generated solution to the maximum possible value. The stochastic approximation to MAXCUT with the largest known approximation ratio is the Goemans-Williamson (GW) algorithm. The GW algorithm provides the best approximation ratio achievable by any polynomial-time algorithm under the Unique Games Conjecture. To generate solutions, this algorithm requires sampling from a Gaussian distribution with a specific covariance matrix obtained by solving a semi-definite program related to the adjacency matrix of the graph.

An illustrative embodiment provides a neural circuit that implements this sampling step by using simple neuron models to transform uniform device randomness into the required distribution. This demonstrates the use of neuromorphic principles to transform an intrinsic source of randomness into a computationally useful distribution.

Another stochastic approximation for MAXCUT is the Trevisan algorithm. Despite having a worse theoretical approximation ratio, in practice this algorithm generates solutions on par with the Goemans-Williamson algorithm. To generate solutions, the Trevisan algorithm requires computing the minimum eigenvector of the normalized adjacency matrix.

Another illustrative embodiment provides a neuromorphic circuit that implements the Trevisan algorithm using the same circuit motif as above to generate random numbers with a specific correlation. However, instead of sampling cuts from this distribution, this embodiment uses these numbers to drive a synaptic plasticity rule (Oja's rule) inspired by the Hebbian principle in neuroscience. This learning rule can be shown to converge to the desired eigenvector, from which the solution can be sampled. This circuit solves the MAXCUT problem entirely within the circuit, without requiring any external preprocessing, demonstrating the capacity of neuromorphic circuits driven by intrinsic randomness to solve parallel computationally relevant problems.

FIG. 1 depicts a block diagram of a discrete optimization system in accordance with an illustrative embodiment. Discrete optimization system 100 comprises neuromorphic circuit 102, which includes a number of random noise-generating devices 104 and a number of leaky integrate and fire (LIF) neurons 108.

The random noise-generating devices 104 generated random bits 106. The random noise-generating devices 104 are connected to LIF neurons 108 by respective connections 114, which have assigned weights 116. Weights 116 are chosen to produce a correlation matrix 130 for the activity variables of the LIF neurons 108. The specific desired correlation matrix 130 is determined by the particular discrete optimization to be solved. Random bits 106 from the random noise-generating devices 104 are used to produce any desired correlation matrix required by an algorithm. The present disclosure uses the examples of GW and Trevisan algorithms, but it should be kept in mind that the application of the illustrative embodiments is not limited to these algorithms.

Weights 116 are proportional to a number of vectors calculated according to a semidefinite programming (SDP) problem 132. Weights 116 may be set proportional to the adjacency matrix 126 of graph 122. Graph 122 defines the specific discrete optimization problem to be solved. Stated differently, graph 122 is mapped to the discrete optimization problem, which determines how to set connections 114 between the random noise-generating devices 104 and LIF neurons 108. The adjacency matrix 126 represents the connectivity relations in graph 122. Typically, if A is an adjacency matrix, the entry in the i-th row and j-th column ($A_{ij}$) has the value 1 if vertex i and vertex j are connected by an edge and a value of 0 if they are disconnected. The adjacency matrix 126 may have values other than 1 or 0 if there are weights on the connecting edges. The meaning of such weights is application specific. For example, the weight on an edge might represent the distance between the two vertices in question. The circuits described below work regardless of the weights or meaning associated with the weights.

Covariance matrix 128 defines an inner product on the space of weight vectors 110 for each of the LIF neurons 108.

LIF neurons 108 produce correlated activity variables 112 from the random bits 106 according to the weights 116 assigned to connections 114. Spikes generated by LIF neurons 108 correlated to vertices 124 of graph 122.

Correlated activity variables 112 are fed to an output LIF neuron 118, which outputs an approximate solution 120 to the discrete optimization problem.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 150 is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a tablet computer, or some other suitable data processing system.

As depicted, computer system 150 includes a number of processor units 152 that are capable of executing program code 154 implementing processes in the illustrative examples. As used herein a processor unit in the number of processor units 152 is a hardware device and is comprised of hardware circuits such as those on an integrated circuit that respond and process instructions and program code that operate a computer. When a number of processor units 152 execute program code 154 for a process, the number of processor units 152 is one or more processor units that can be on the same computer or on different computers. In other words, the process can be distributed between processor units on the same or different computers in a computer system. Further, the number of processor units 152 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Unlike other hardware approaches to MAXCUT, the illustrative embodiments directly instantiate state-of-the-art MAXCUT approximation algorithms on arbitrary graphs without requiring costly reconfiguration or conversion of the problem to an Ising model with pairwise interactions. The use of hardware resources is scalable, requiring one neuron and one random device per vertex, and is thus more efficient than parallel implementations of MAXCUT using GPUs. These properties make the illustrative embodiments valuable to the expanding field of beyond-Moore parallel algorithms.

Figure 2:
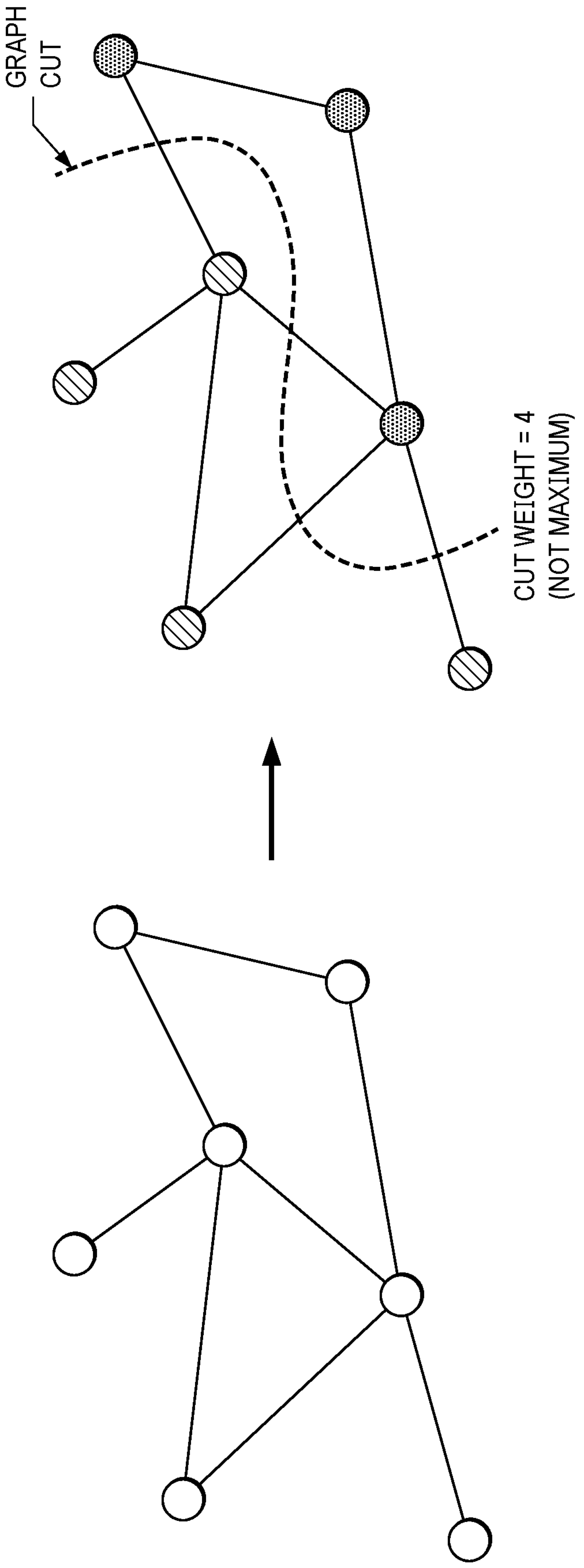
FIG. 2 depicts application of MAXCUT to a graph to which the illustrative embodiments may be implemented.

FIG. 2 depicts application of MAXCUT to a graph to which the illustrative embodiments may be implemented. MAXCUT seeks to partition a graph's vertices into two subsets, $V=V_{-1}\cup V_1$ such that the number of edges that cross between the two sets is maximized. The graph MAXCUT problem requires solving the following discrete optimization problem, where $A_{ij}$ is the adjacency matrix of the graph:

$$\max_{v} \frac{1}{2}\sum_{ij\in V} A_{ij}(1-v_i v_j) \quad \text{s.t. } v\in\{-1,1\}^n. \tag{Eq. 1}$$

For graph G, OPT (G) is the maximization value of the function.

Figure 3:
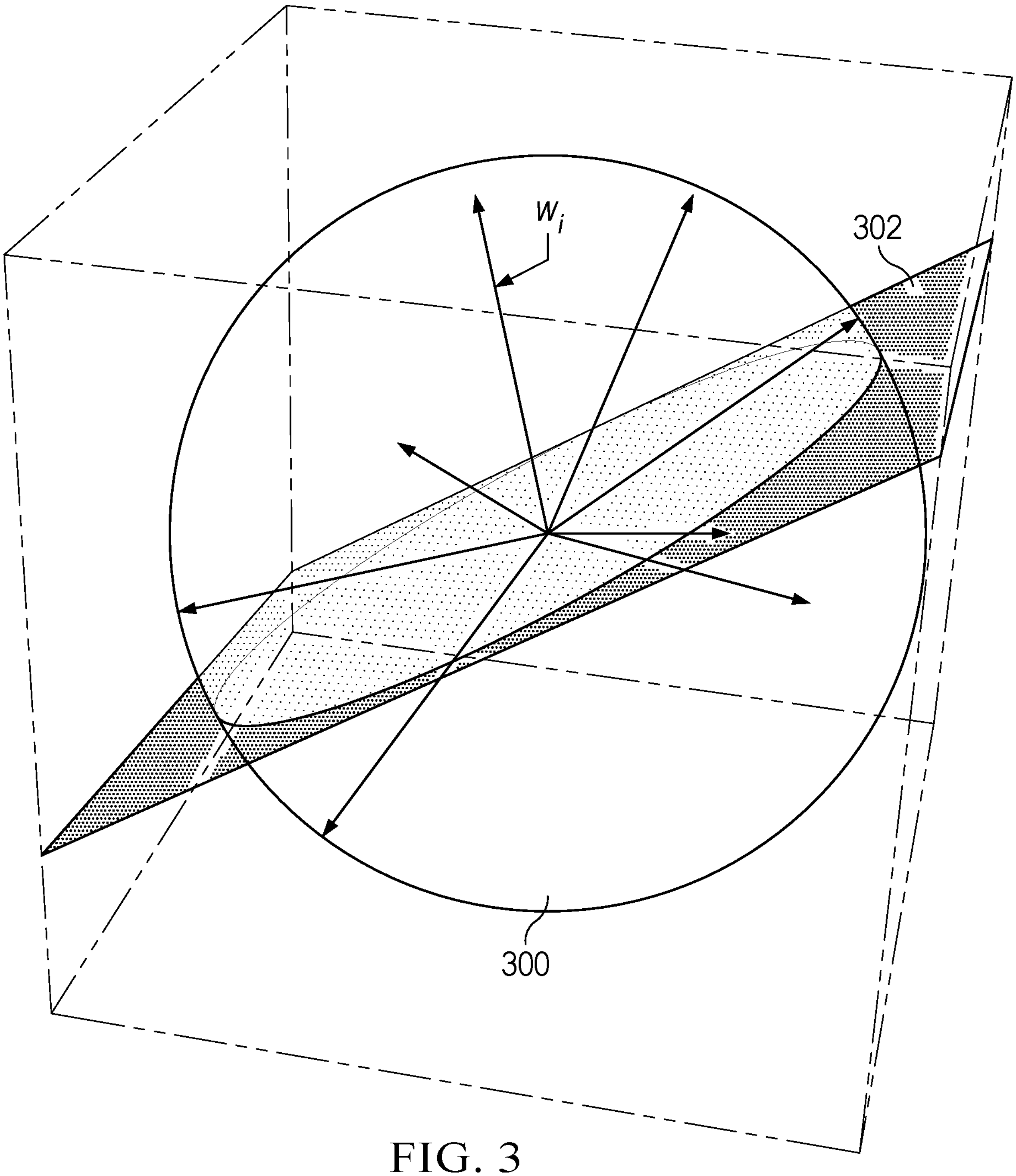
FIG. 3 depicts an n-dimensional sphere representing vectors used to set the weight matrix between random inputs and LIF neurons in accordance with an illustrative embodiment.

MAXCUT is known to be nondeterministic polynomial-time complete (NP-complete. The GW algorithm relaxes the cost function by replacing the integer values of v with unit vectors to yield the following semidefinite programming program, given by:

$$\max_{w} \frac{1}{2}\sum_{ij} A_{ij}(1-w_i\cdot w_j) \quad \text{s.t. } w_i\in\mathcal{S}^{n-1}, \tag{Eq. 2}$$

where $S^{n-1}$ is the (n−1)-dimension unit sphere in $\mathbb{R}^n$ (see FIG. 3). Let DP(G) be the value of the optimal solution of this semidefinite programming problem, wherein OPT(G)≤SDP(G).

Figure 4:
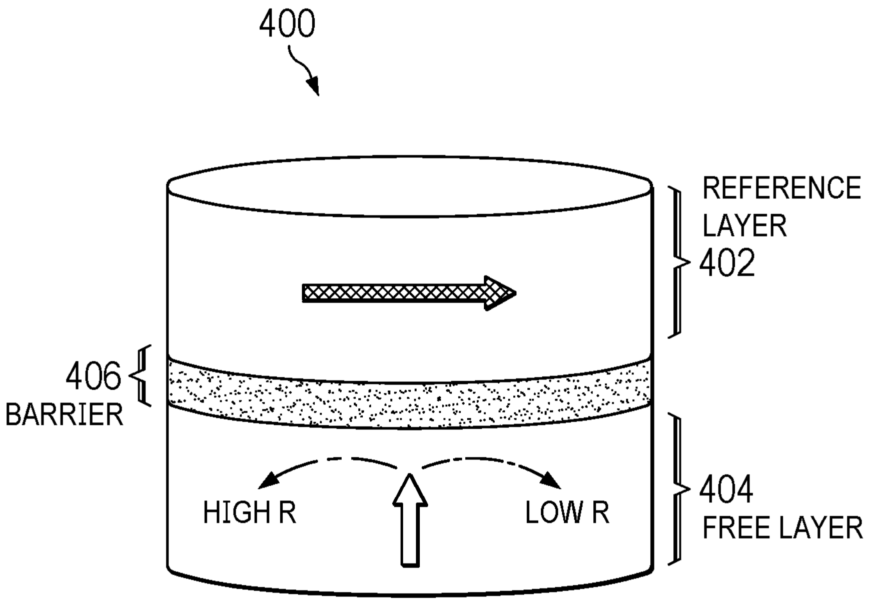
FIG. 4 depicts a diagram of a stochastic magnetic tunnel junction in accordance with an illustrative embodiment.

FIG. 3 depicts an n-dimensional sphere 300 representing vectors used to set the weight matrix between random devices and LIF neurons in accordance with an illustrative embodiment (see FIG. 4). In the application of the GW algorithm, these vectors are determined by the semi-definite program (SDP). The solution of this SDP problem is a set of unit vectors $w_i$, one for each vertex in the graph. Given these vectors, a graph cut is generated by taking a random hyperplane 302 through the origin and assigning the value +1 to vertices with vectors above the plane and −1 to vertices with vectors below the plane.

One can see that the GW algorithm has two steps. The first step comprises solving a semidefinite programming (SDP) problem, and the second step rounds each unit vector $w_i$ to an integer $z_i\in\{-1, +1\}$, where $i\in V$. The rounding step can be implemented by sampling dependent standard normal random variables, with one variable per vertex. Specifically, supposing for each vertex i there is a random variable $X_i$ following the standard normal distribution, and for each pair of vertices i and j the covariance between $X_i$ and $X_j$ is $w_i\cdot w_j$, where $w_i$ and $w_j$ are the unit vectors in the solution to the SDP problem. One can show that such a set of dependent random variables exists. Defining a (random) cut by assigning +1 to vertices i where $X_i$ is positive and assigning −1 to vertices i where $X_i$ is negative, one can show that the resulting cut has the same approximation guarantees as the cut returned by the GW algorithm. The present disclosure will sometimes refer to the rounding step as the sampling step. The GW algorithm has an approximation ration between expect cut weight versus absolute maximum of 0.878.

The Trevisan algorithm is another random approximation algorithm for MAXCUT. Though it has a worse theoretical approximation ratio (0.631) than the GW algorithm, in practice it can perform just as well and has speed advantages. Here we consider a slight modification of the full Trevisan algorithm we refer to as the Trevisan Simple Spectral algorithm. In contrast to use of the n-dimensional sphere 300 for the GW algorithm to set weights between random devices and LIF neurons, application of the Trevison algorithm employs a graph adjacency matrix to set the weights between random devices and LIF neurons (see FIG. 6). The operating principle of the LIF neuron population is the same in both cases: the weights between the random devices and LIF neurons determine the connections between the LIF neurons. The weights are chosen to generate whatever correlations are needed for the algorithm in question.

Given a graph G=(V, E) with adjacency matrix A and diagonal degree matrix D, the normalized adjacency matrix $A=D^{-1/2}\ AD^{1/2}$ is computed. Next, the eigenvector corresponding to the minimum eigenvalue of the matrix I+A is computed. The graph cut is obtained by thresholding the values of this eigenvector by sign. If u is the minimum eigenvector of A, then the graph cut is given by:

$$v_i = \begin{cases} -1 & u_i \leq 0 \\ 1 & u_i > 0 \end{cases} \quad \text{Eq. 3}$$

Physical microelectronics display intrinsic stochasticity due to the physics behind their operation. Typically, this stochasticity is observed as random switching between two or more states. While normally a nuisance, the details of this stochastic behavior are under active research to develop devices with tunable statistics for probabilistic computing applications. The illustrative embodiments idealize stochastic devices as analogous to "coin flips" such that at any given time, the device can be in one of two states ("heads" or "tails"; "0" or "1") with a specific probability. The circuits of the illustrative embodiments assume random devices behave as fair coins. That is, each state has a probability of 0.5. Thus, a random device is modeled as a source for a random bit stream with equal probabilities of 0 or 1. Magnetic tunnel junctions and tunnel diodes are examples of two classes of devices actively being developed to meet these requirements.

FIG. 4 depicts a diagram of a stochastic magnetic tunnel junction in accordance with an illustrative embodiment. MTJ 400 is a tunneling device comprising two thin magnetic metal electrodes 402, 404 separated by a thin insulating tunnel barrier 406. MTJ 400 can be readily integrated into back-end-of-line complementary metal-oxide semiconductor (CMOS) manufacturing. MTJ 400 is in the form of a nanopillar with a diameter less than about 50 nm with one electrode 402 with fixed magnetic moment and the other electrode 404 with a magnetic moment that is free to reorient. The tunneling resistance depends on the relative alignment of the magnetic moments of the electrodes 402, 404. Anti-alignment produces a high resistance state and parallel alignment produces a low resistance state, with a resistance change of a factor or 2 or 3 commonly realized.

MTJ 400 can also be thought of in terms of a double-well potential, with the x-axis being the magnetization of the free layer electrode 404. In one mode of operation thermal energy can switch the orientation of the free layer electrode 404, an effect known as superparamagnetism, producing two-level resistance fluctuations in the MTJ 400. In a second mode of operation, applied current pulses are used to initialize the free layer electrode 404 into a known unstable magnetic state, which is read out after letting the device relaxes into one of the two stable states.

Figure 5:
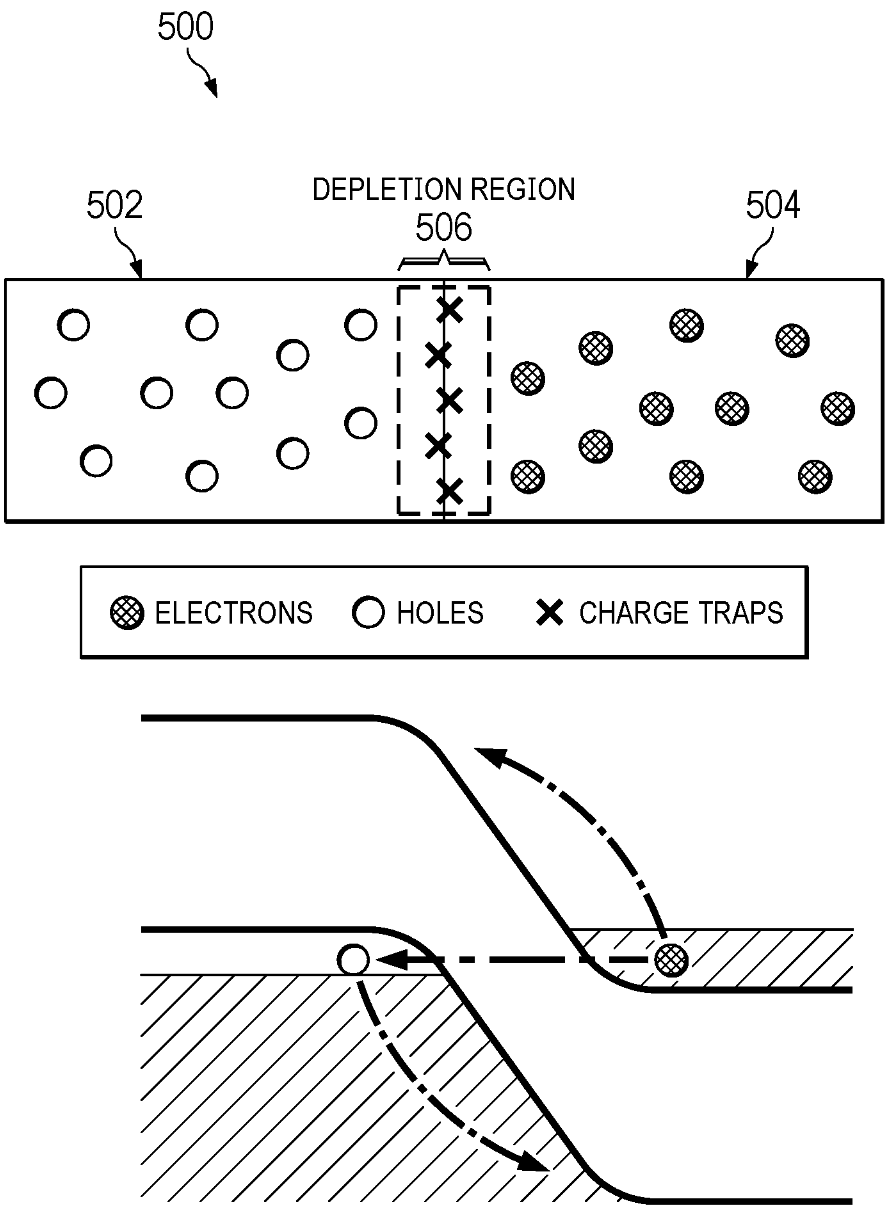
FIG. 5 depicts a depicts a diagram of a stochastic tunnel diode in accordance with an illustrative embodiment.

FIG. 5 depicts a depicts a diagram of a stochastic tunnel diode in accordance with an illustrative embodiment. Tunnel diode (TD) 500 comprises a strongly p-type doped region 502 and n-type doped region 504 in a semiconductor, wherein the resulting depletion region 506 between them is very narrow. While large discrete TDs have historically been used in analog high-speed electronics, the illustrative embodiments may employ nanoscale TDs integrated into front-end-of-line CMOS manufacturing for probabilistic computing. TD 500 can conduct the same amount of current either through tunneling or thermionic emission. Which branch the device takes depends on detailed charge occupancy of the defects in the junction and is detected by the TD 500 as a low (tunneling) or high (thermionic emission) voltage.

Conceptually, it is easiest to think of the TD in terms of a double-well potential where the x-axis is the charge occupancy of a single defect. Tuning this device is accomplished with a current pulse that gives the defect an average charge occupancy corresponding to the weight of the coinflip.

Devices such as MTJs and TDs will switch randomly between two states (referred to as "heads" and "tails", which by convention equal "1" and "0", respectively). The switching between states ("H→T" or "T→H") can be viewed as a Poisson process; at any given instant (however defined), there is some probability that the device may switch states. If the probability of going from heads to tails is equal to that of going from tails to heads, the switching can be considered balanced. However, if, for whatever reason, the probability of going from H→T is different from T→H, the switching will be unbalanced, and the device will more likely be in one state than the other.

Over longer time scales, one can view a sample of the state of any one of these devices as a Bernoulli process (b=1 with some probability p (b)). A Bernoulli process is akin to a coinflip, generating a "heads" with a certain probability. The "fair" coinflip has a probability of 0.5, and an "unfair" coin would make one or the other outcome more likely. Ultimately, the ratio of the probabilities (P(H→T) and P(T→H)) will determine the Bernoulli probability of the device, and the ability to control these will directly relate to the precision and reliability of the device's random sample.

Due to the physics of these devices, it is possible, depending on the materials and the length and time scales, that devices can be correlated with one another. Similarly, it is possible that two samples from the same device will exhibit correlations depending on the time difference. The algorithms of the illustrative embodiments are able to make use these correlations, though the exact details of how the correlations operate are key to their utility.

The LIF neuron is a simplified model of biological neurons, readily implemented in hardware, that captures a biological neuron's capacity for temporal integration of synaptic inputs along with discontinuous spiking. The model integrates synaptic currents with a membrane capacitance into a membrane potential that is continuously discharged by a leak conductance. When the integrated membrane potential reaches some threshold, a spike is emitted, and the membrane potential is reset to some defined value. In between spike events, the membrane potential evolves according to the differential equation:

$$C\frac{dV}{dt} = -\frac{V}{R} + I_{tot} \quad \text{Eq. 4}$$

where V is the membrane potential, C is the membrane capacitance, R is the leak resistance, and $I_{tot}$ is the total synaptic input current.

When a single LIF neuron receives large numbers of stochastic input currents, the membrane potential approximates a one-dimensional random walk. The leak capacitance stabilizes this walk around an analytically computable mean:

$$\langle V \rangle = R\langle I_{tot} \rangle \quad \text{Eq. 5}$$

and variance $$\text{Var}(V) = \frac{R}{C}\text{Var}(I_{tot}) \quad \text{Eq. 6}$$

For a population of n LIF neurons integrating random binary inputs generated by r random devices, the expression for the membrane potential dynamics of a single LIF neuron becomes:

$$C\frac{dV_i}{dt} = -\frac{V_i}{R} + \sum_{\alpha} W_{i\alpha} s_{\alpha} \quad \text{Eq. 7}$$

where $W_{i\alpha}$ is the real-valued connection weight between device α and LIF neuron i. The variable $s_{\alpha}$ is the state of device α and takes the values {0, 1}.

Shared or inverted input between two LIF neurons induces correlations or anticorrelations in their membrane potentials, respectively. The expression for the covariance between the membrane potentials of neurons i and j is:

$$\text{Cov}(V_i, V_j) = \frac{R}{C}\sum_{\alpha\beta} W_{i\alpha} W_{j\beta}\text{Cov}(s_{\alpha}, s_{\beta}) \quad \text{Eq. 8}$$

In other words, the LIF membrane covariances are a linear transformation of the covariances of the random device pool. The device covariance matrix defines an inner product on the space of weight vectors for each LIF neuron. If the devices are independent, then the device covariance matrix is diagonal. Thus, the LIF neuron population transforms the device randomness into a set of Gaussian processes with covariance proportional to the Gram matrix of the weight vectors. In what follows, choosing the weights appropriately allows this circuit motif to supply random samples with the appropriate covariances for the stochastic MAXCUT approximation algorithms.

In neuroscience, the guiding principle of synaptic plasticity is captured by the adage "neurons that fire together, wire together." This is the Hebbian learning principle. If w is the weight vector between presynaptic neuron activity x and postsynaptic neuron activity y, the simplest instantiation of this principle is given the formula:

$$\Delta w = yx \quad \text{Eq. 9}$$

As stated, this rule is unstable. Oja presented a modification to this plasticity rule that preserved the Hebbian principle but enforces weight stability. Oja's rule is given by the formula:

$$\Delta w = y(x - yw) \quad \text{Eq. 10}$$

Oja proved that under mild assumptions this rule forces the weight vector to converge to the first principle component of the covariance matrix of the inputs, or equivalently the eigenvector corresponding the largest eigenvalue.

By considering anti-Hebbian plasticity, Oja derived a related, stabilized learning rule that converges to the minimum eigenvector of the covariance matrix:

$$\Delta w = -yx + \left(y^2 + 1 - w^T w\right)w \quad \text{Eq. 11}$$

By providing inputs with covariance proportional to the adjacency matrix of the graph as used in Trevisan's algorithm, Oja's anti-Hebbian rule can find the minimum eigenvector of this matrix, yielding an approximate solution to MAXCUT.

Figure 6:
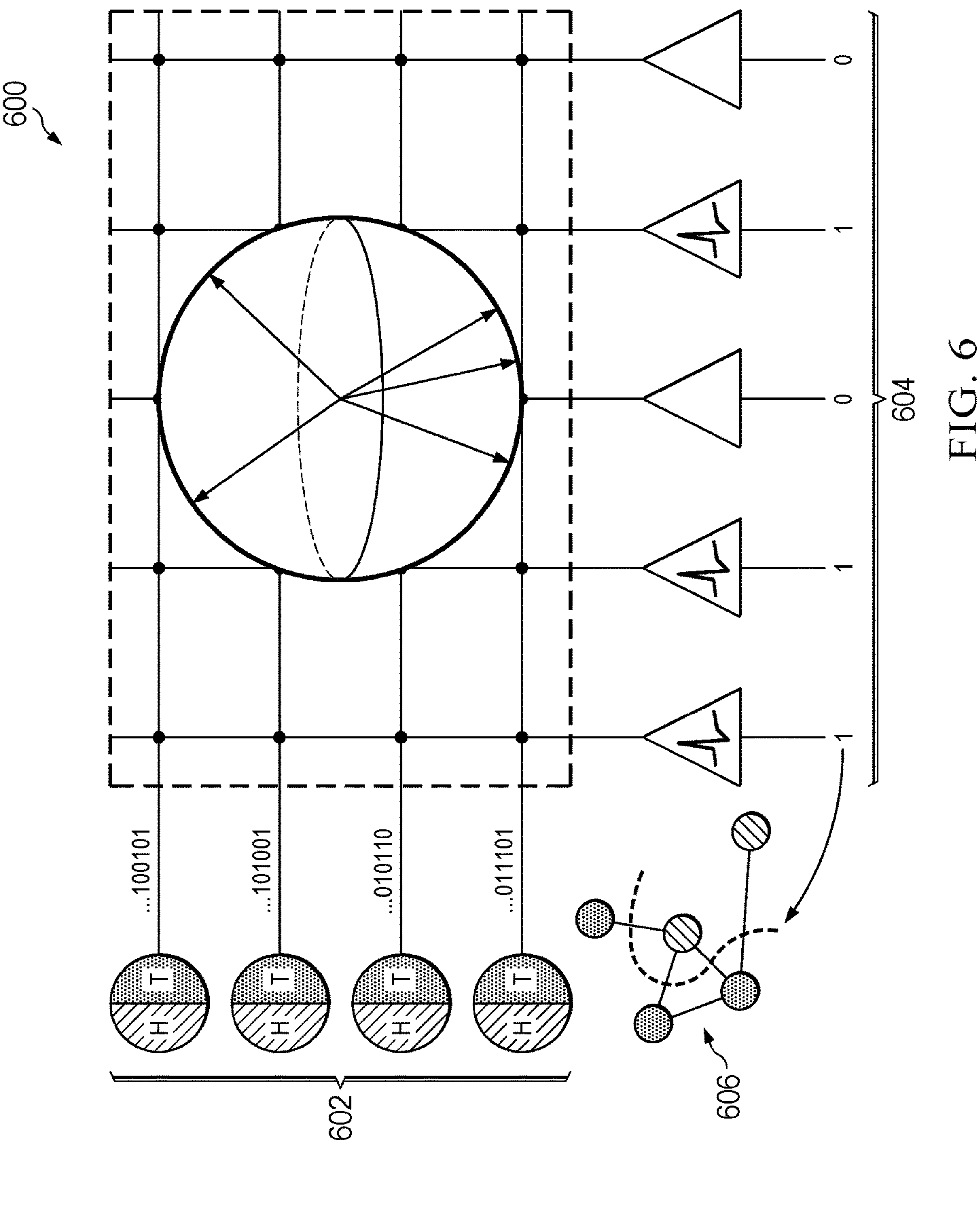
FIG. 6 depicts a neuromorphic circuit that implements the sampling step of the Goemans-Williamson algorithm in accordance with an illustrative embodiment.

FIG. 6 depicts a neuromorphic circuit that implements the sampling step of the Goemans-Williamson algorithm in accordance with an illustrative embodiment. The requirement is to generate binarized samples from a Gaussian distribution with specified covariance matrix C. This circuit is referred to with the abbreviation LIF-GW.

For a graph, G, the GW SDP is solved to yield a set of n unit vectors in r dimensions, where r is the rank of the solution and n is the number of vertices. These vectors can be combined into the n by r dimensional matrix $W_{GW}$.

Figure 7:
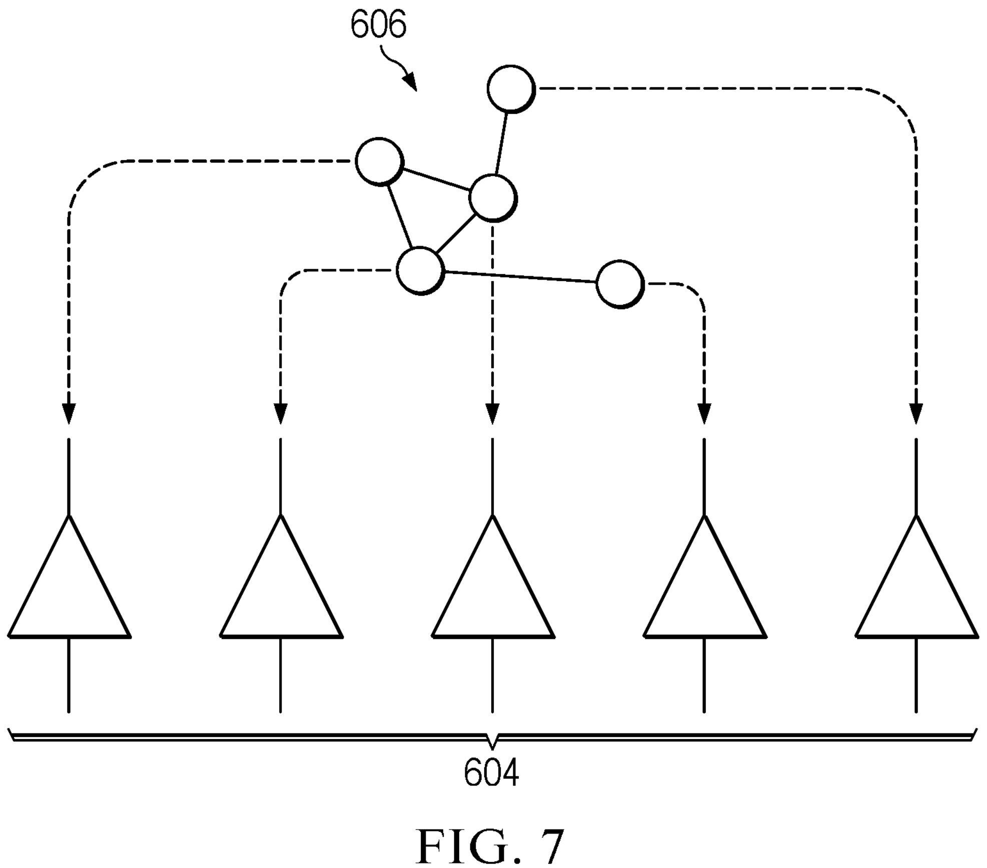
FIG. 7 illustrates the correspondence between LIF neuron spikes and vertices of a graph.

The LIF-GW circuit 600 comprises a pool of r random devices 602 (random noise generators) connected to n LIF neurons 604. The number of random devices 602 can vary according to the fidelity of the sampler. Spikes from LIF neurons 604 correspond to binary labels on the vertices of the graph 606, G, defining the cut (see FIG. 7). The synaptic weights between the random devices 602 and the LIF neurons 604 are chosen proportional to the corresponding entries in $W_{GW}$. The precise magnitudes of these weights are not critical; what matters are their relative values, as these ratios determine the LIF covariances. The relative weight values and covariances allow the circuit to be adapted to specific hardware implementations imposing constraints on the range of available weights.

The covariances of the LIF membrane potentials are determined by the weight matrix from the random devices 602 to the LIF neurons 604. Each LIF neuron's weight vector is set proportional to a vector determined through the solution to the GW SDP. Choosing the weights proportional to the solution to the SDP yields membrane covariances proportional to those required by the GW algorithm. The spiking threshold of the LIF neurons 604 implements a rounding and sampling operation that is mapped to graph cuts. Neurons that spike together on a given timestep map to vertices on one side of the cut, and neurons that are silent on a given timestep map to vertices on the other side of the cut.

Figure 8:
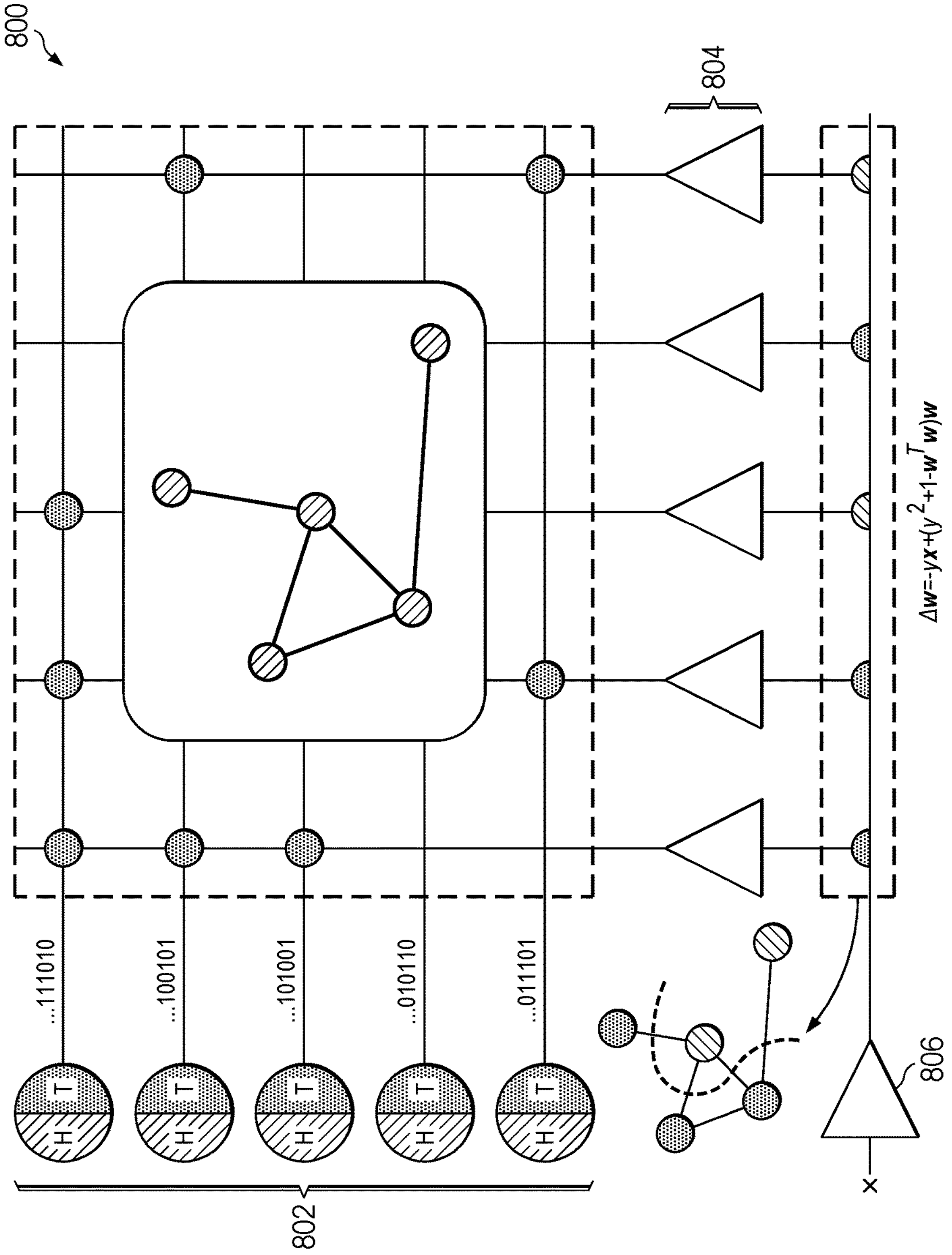
FIG. 8 neuromorphic circuit implements a spectral modification of Trevisan's algorithm in accordance with an illustrative embodiment.

FIG. 8 neuromorphic circuit implements a spectral modification of Trevisan's algorithm in accordance with an illustrative embodiment. This circuit 800 is referred to as either LIF-Trevisan or LIF-TR. The LIF-TR circuit 800 implements a stochastic approximation of MAXCUT by combining hardware randomness with anti-Hebbian synaptic stability.

Like the LIF-GW circuit 800, the first stage of the LIF-TR circuit comprises a population of LIF neurons 804, one for each vertex in the graph, driven by a pool of random devices 802. In this embodiment the number of random devices 802 is equal to the number of LIF neurons 804. The connection weights between the random devices 802 and the LIF neurons 804 are set proportional to the adjacency matrix of the graph, G.

The output of the LIF neuron population 804 is fed onto a single output LIF neuron 806. The output of this Stage-2 LIF neuron 806 is discarded. What matters is the weight vector w linking the Stage-1 population of LIF neurons 804 to the Stage-2 output LIF neuron 806. The solution is sampled by thresholding this weight vector w by sign: excitatory, positive weights correspond to one side of the graph cut, and inhibitory, negative weights correspond to the other side of the graph cut. The weight vector w is controlled by Oja's anti-Hebbian plasticity rule, which forces the weight vector w to converge onto the minimum eigenvector of the LIF covariance matrix.

The LIF covariance matrix is determined by the connection weights between the random devices 802 and the LIF neurons 804. These weights are set proportional to the Trevisan matrix, which is the sum $I+D^{-1/2}AD^{-1/2}$ of the identity plus the normalized adjacency matrix of the graph. In this way, the LIF-TR circuit 800 does not require solving an SDP offline.

Figure 9:
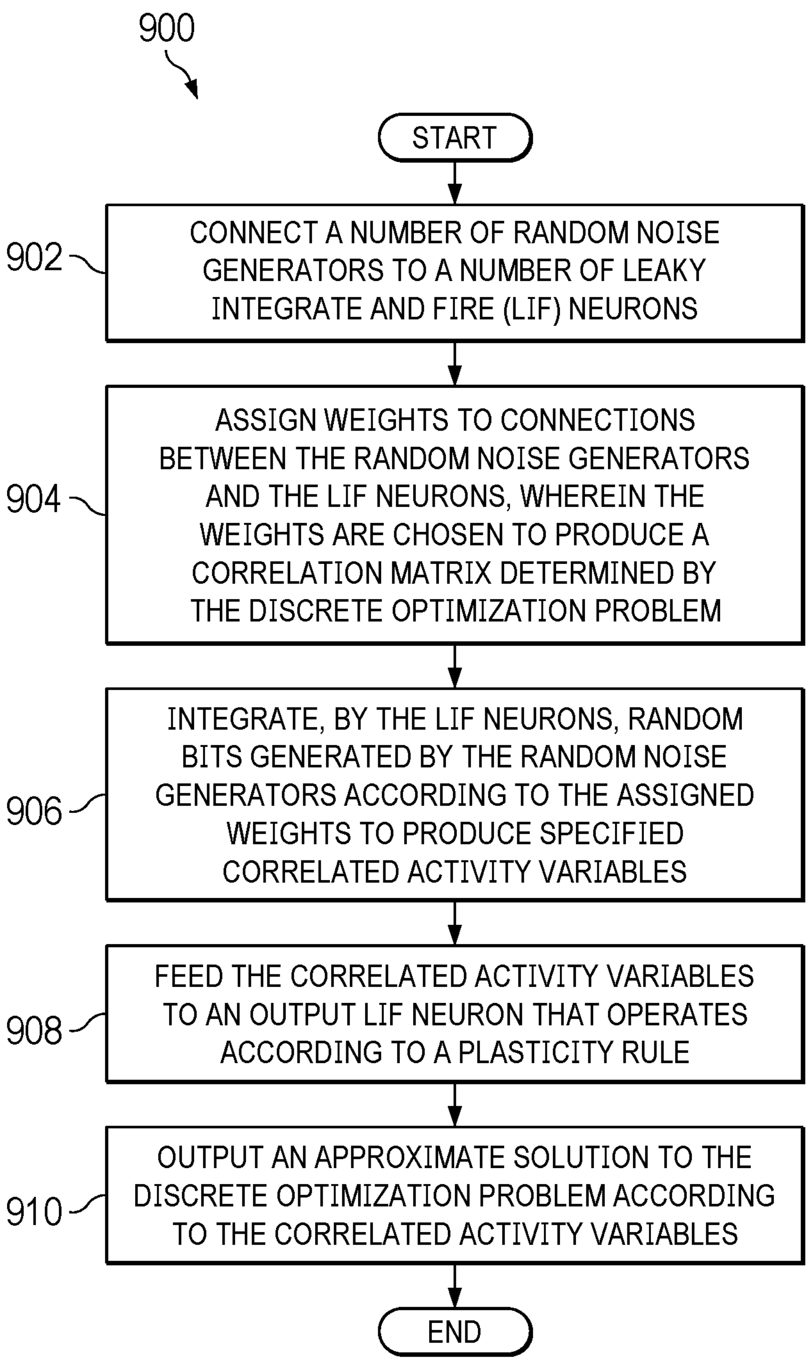
FIG. 9 depicts a flowchart illustrating a process for solving a discrete optimization problem in a neuromorphic device in accordance with illustrative embodiments.

FIG. 9 depicts a flowchart illustrating a process for solving a discrete optimization problem in a neuromorphic device in accordance with illustrative embodiments. Process 900 might be implemented in discrete optimization system 100 shown in FIG. 1.

Process 900 begins by connecting a number of random noise generators to a number of leaky integrate and fire (LIF) neurons (step 902). The random noise generators might comprise coin flip devices, which can be unbiased, Bernoulli devices or biased coin flip devices. The number of random noise generators might equal the number of LIF neurons. Alternatively, the number of random noise generators might vary depending on the specified fidelity of sampling.

Weights are assigned to the connections between the random noise generators and the LIF neurons (step 904). The weights are chosen to produce a correlation matrix determined by the discrete optimization problem. The weights assigned to the connections between the random noise generators and the LIF neurons might be proportional to a number of vectors calculated according to a semidefinite programming (SDP) problem. Alternatively, the weights assigned to the connections between the random noise generators and the LIF neurons might be proportional to an adjacency matrix.

The LIF neurons integrate random bits generated by the random noise generators according to the assigned weights to produce specified correlated activity variables (step 906).

The correlated activity variables are fed to an output LIF neuron that operates according to a plasticity rule (step 908). The output LIF neuron might operate according to a Hebbian plasticity rule. Alternatively, the output LIF neuron might operate according to an anti-Hebbian plasticity rule.

The output LIF neuron outputs an approximate solution to the discrete optimization problem according to the correlated activity variables (step 910).

Figure 10:
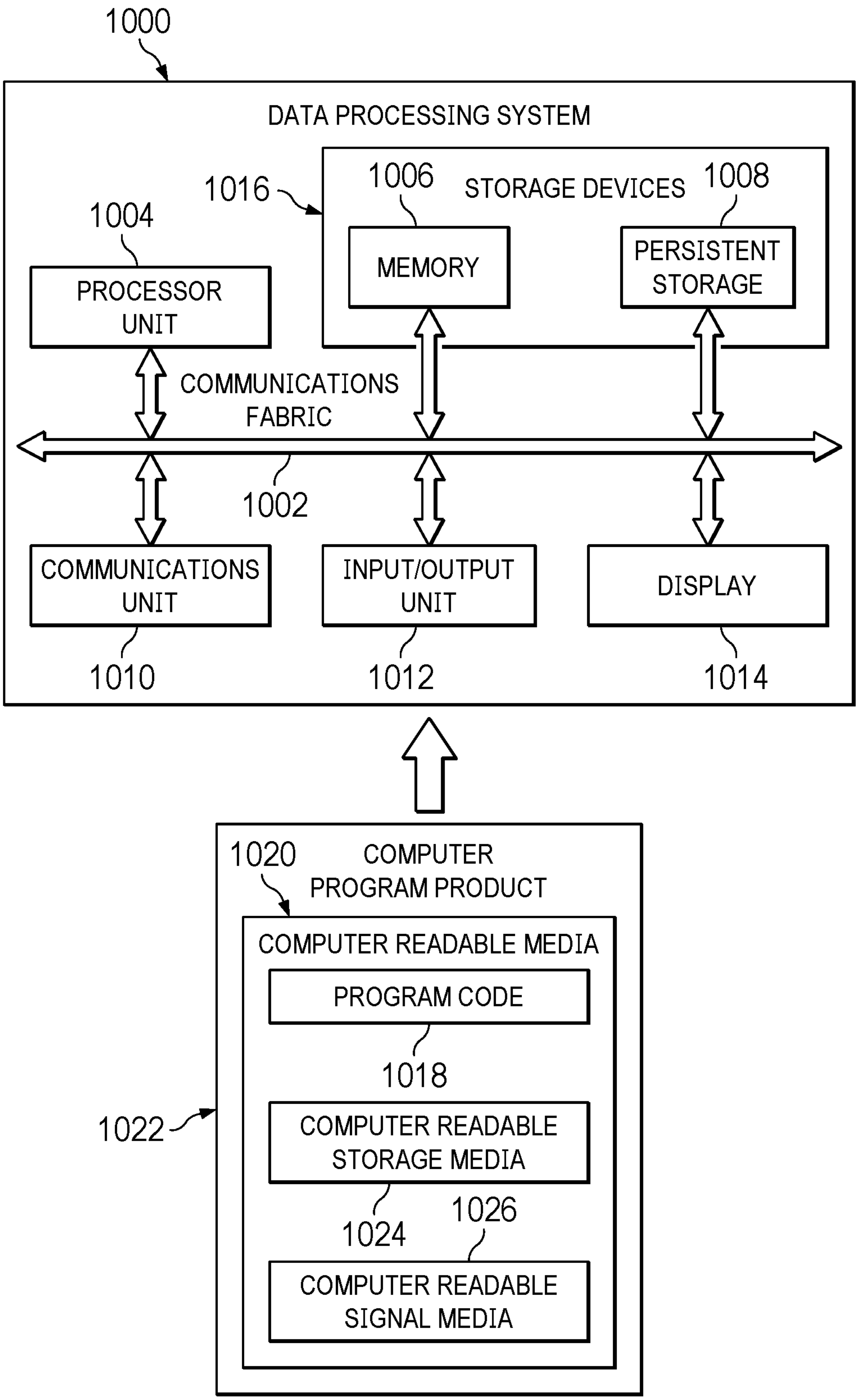
FIG. 10 is a diagram of a data processing system depicted in accordance with an illustrative embodiment.

Turning now to FIG. 10, an illustration of a block diagram of a data processing system is depicted in accordance with an illustrative embodiment. Data processing system 1000 may be used to implement computer system 150 in FIG. 1. In this illustrative example, data processing system 1000 includes communications fabric 1002, which provides communications between processor unit 1004, memory 1006, persistent storage 1008, communications unit 1010, input/output unit 1012, and display 1014. In this example, communications fabric 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUs). In an alternate embodiment, processor unit 1004 comprises one or more graphical processing units (GPUs).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications fabric 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Computer readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1018 may be transferred to data processing system 1000 using computer-readable signal media 1026. Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for solving a discrete optimization problem in a neuromorphic device, the method comprising:

connecting a number of random noise generators to a number of leaky integrate and fire (LIF) neuromorphic neurons, wherein the number of random noise generators depends on a specified fidelity of sampling;

assigning weights to the connections between the random noise generators and the LIF neurons, wherein the weights are chosen to produce a correlation matrix determined by the discrete optimization problem and are proportional to a number of vectors calculated according to a semidefinite programming (SDP) problem;

integrating, by the LIF neuromorphic neurons, random bits generated by the random noise generators according to the assigned weights to produce specified correlated activity variables;

feeding the correlated activity variables to an output LIF neuromorphic neuron that operates according to a plasticity rule; and outputting, by the output LIF neuromorphic neuron, an approximate solution to the discrete optimization problem according to the correlated activity variables.

2. The method of claim 1, wherein the random noise generators comprise coin flip devices.

3. The method of claim 2 wherein the coin flip devices are unbiased Bernoulli devices.

4. The method of claim 2, wherein the coin flip devices are biased.

5. The method of claim 1, wherein the output LIF neuromorphic neuron operates according to a Hebbian plasticity rule.

6. The method of claim 1, wherein the output LIF neuromorphic neuron operates according to an anti-Hebbian plasticity rule.

7. The method of claim 6, wherein the weights assigned to the connections between the random noise generators and the LIF neuromorphic neurons are proportional to an adjacency matrix.

8. The method of claim 6, wherein the number of random noise generators equals the number of LIF neuromorphic neurons.

9. A neuromorphic device for solving a discrete optimization problem, the neuromorphic device comprising:

a number of random noise generators, wherein the number of random noise generators depends on a specified fidelity of sampling;

a number of leaky integrate and fire (LIF) neuromorphic neurons connected to the random noise generators, wherein the LIF neuromorphic neurons integrate random bits generated by the random noise generators according to the assigned weights to produce specified correlated activity variables, and wherein weights are assigned to the connections between the random noise generators and the LIF neuromorphic neurons, wherein the weights are chosen to produce a correlation matrix determined by the discrete optimization problem and are proportional to a number of vectors calculated according to a semidefinite programming (SDP) problem; and an output LIF neuromorphic neuron operating according to a plasticity rule receives the correlated activity variables and outputs an approximate solution to the discrete optimization problem according to the correlated activity variables.

10. The neuromorphic device of claim 9, wherein the random noise generators comprise coin flip devices.

11. The neuromorphic device of claim 10, wherein the coin flip devices are unbiased Bernoulli devices.

12. The neuromorphic device of claim 10, wherein the coin flip devices are biased.

13. The neuromorphic device of claim 9, wherein the output LIF neuromorphic neuron operates according to a Hebbian plasticity rule.

14. The neuromorphic device of claim 9, wherein the output LIF neuromorphic neuron operates according to an anti-Hebbian plasticity rule.

15. The neuromorphic device of claim 14, wherein the weights assigned to the connections between the random noise generators and the LIF neuromorphic neurons are proportional to an adjacency matrix.

16. The neuromorphic device of claim 14, wherein the number of random noise generators equals the number of LIF neuromorphic neurons.

* * * * *